(12) United States Patent
Zhao

(10) Patent No.: US 11,470,608 B2
(45) Date of Patent: Oct. 11, 2022

(54) D2D COMMUNICATION METHOD AND DEVICE

(71) Applicant: HUAWEI TECHNOLOGIES CO., LTD., Guangdong (CN)

(72) Inventor: Zhenshan Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 23 days.

(21) Appl. No.: 16/138,521

(22) Filed: Sep. 21, 2018

(65) Prior Publication Data
US 2019/0029020 A1 Jan. 24, 2019

Related U.S. Application Data

(63) Continuation of application No. PCT/CN2016/077791, filed on Mar. 30, 2016.

(51) Int. Cl.
*H04W 72/04* (2009.01)
*H04L 5/00* (2006.01)
*H04W 92/18* (2009.01)

(52) U.S. Cl.
CPC ....... *H04W 72/0453* (2013.01); *H04L 5/0044* (2013.01); *H04L 5/0094* (2013.01);
(Continued)

(58) Field of Classification Search
CPC . H04W 72/04; H04W 72/0453; H04W 72/02; H04W 76/14
See application file for complete search history.

(56) References Cited

U.S. PATENT DOCUMENTS

| 2015/0334698 A1 | 11/2015 | Park et al. |
| 2016/0095024 A1* | 3/2016 | Chae ............ H04W 76/14 370/280 |
| 2016/0286570 A1 | 9/2016 | Chae et al. |

(Continued)

FOREIGN PATENT DOCUMENTS

| CN | 105101392 A | 11/2015 |
| CN | 105338637 A | 2/2016 |

(Continued)

OTHER PUBLICATIONS

3GPP TS 36.213 V13.1.0 (Mar. 2016), 3rd Generation Partnership Project;Technical Specification Group Radio Access Network;Evolved Universal Terrestrial Radio Access (E-UTRA); Physical layer procedures(Release 13), Mar. 2016. total 361 pages.
3GPP TS 36.331 V12.8.0 (Dec. 2015), 3rd Generation Partnership Project;Technical Specification Group Radio Access Network;Evolved Universal Terrestrial Radio Access (E-UTRA); Radio Resource Control (RRC);Protocol specification (Release 12), Dec. 2015. total 456 pages.

(Continued)

*Primary Examiner* — Ayaz R Sheikh
*Assistant Examiner* — Debebe A Asefa
(74) *Attorney, Agent, or Firm* — Fish & Richardson P.C.

(57) ABSTRACT

A device to device (D2D) communication method includes: receiving, by user equipment (UE), resource pool configuration information, where the resource pool configuration information includes frequency domain resource location information and time domain resource location information and the frequency domain resource location information includes a frequency domain resource pool indicator and a frequency domain spacing between two consecutive device to device D2D resources; determining, by the UE, an available frequency domain resource based on the resource pool configuration information; and performing, by the UE, (Continued)

D2D communication on the available frequency domain resource.

22 Claims, 5 Drawing Sheets

(52) U.S. Cl.
CPC ............ *H04W 72/04* (2013.01); *H04W 92/18* (2013.01); *Y02D 30/70* (2020.08)

(56) References Cited

U.S. PATENT DOCUMENTS

| | | |
|---|---|---|
| 2016/0295595 A1 | 10/2016 | Chae et al. |
| 2017/0086216 A1* | 3/2017 | Patil ...................... H04W 72/02 |
| 2017/0134146 A1* | 5/2017 | Chae ...................... H04L 5/0092 |
| 2017/0223711 A1 | 8/2017 | Wang et al. |
| 2017/0230928 A1* | 8/2017 | Basu Mallick ... H04W 56/0045 |
| 2017/0367059 A1* | 12/2017 | Park ...................... H04W 76/14 |

FOREIGN PATENT DOCUMENTS

| | | |
|---|---|---|
| WO | 2015050394 A1 | 4/2015 |
| WO | 2015065015 A1 | 5/2015 |
| WO | 2015139304 A1 | 9/2015 |

OTHER PUBLICATIONS

International Search Report and Written Opinion issued in International Application No. PCT/CN2016/077731 dated Dec. 23, 2016, 17 pages.
Qualcomm Inc. (Rapporteur),"WF on Resource Pool Definition",3GPP TSG RAN WG1 #78 R1-143420,Dresden, Germany,Aug. 18-22, 2014,total 3 pages.
Session Chairman (Alcatel-Lucent),"Chairman's Notes of Agenda Item 7.2.3 LTE Device to Device Proximity Services",3GPP TSG RAN WG1 Meeting #78 R1-143590,Dresden, Germany, Aug. 18-22, 2014,total 20 pages.
ZTE,"Discussion on SA pattern design and signaling",3GPP TSG-RAN WG1 #78bis R1-143819,Ljubljana, Slovenia, Oct. 6-10, 2014,total 5 pages.
Extended European Search Report issued in European Application No. 16895966.8 dated Feb. 21, 2019, 10 pages.

* cited by examiner

D2D COMMUNICATION METHOD AND DEVICE

CROSS-REFERENCE TO RELATED APPLICATIONS

This application is a continuation of International Application No. PCT/CN2016/077791, filed on Mar. 30, 2016, the disclosure of which is hereby incorporated by reference in its entirety.

TECHNICAL FIELD

The present invention relates to the field of D2D communications, and in particular, to a D2D communication method and a device.

BACKGROUND

In recent years, device to device (D2D) communication attracts increasing attention from people. The D2D communication may be applied not only to communication between vehicles and communication between a vehicle and a roadside unit, but also to a plurality of scenarios such as communication between a person and a vehicle, to improve safety and reliability of road traffic and improve traffic pass efficiency.

The D2D communication is specifically divided into a D2D discovery mode and a D2D communication mode based on different transmission modes. In the D2D communication mode, data is sent by using a scheduling assignment (SA)+data (service data) mode. When needing to send service data, user equipment first sends SA information. The SA information indicates a location of a time-frequency resource and a coding manner of the service data sent from the transmit end. After successfully receiving and decoding the SA information, user equipment used as a receive end receives the corresponding service data at the location of the time-frequency resource indicated by the SA information, and decodes the corresponding service data based on the coding manner indicated by the SA information.

To receive the SA information, the receive end needs to perform blind detection in an SA resource pool. However, because a possible transmission resource of the SA information is a location of any physical resource block (PRB) in the SA resource pool, if a system bandwidth exceeds 10 MHz (corresponding to 50 PRBs), the receive end needs to blindly detect SA more than 50 times, resulting in relatively high detection complexity and relatively high power consumption at the receive end.

SUMMARY

To reduce power consumption and detection complexity, embodiments of the present invention provide a D2D communication method and a device. The technical solutions are as follows:

According to a first aspect, a D2D communication method is provided, including: receiving, by user equipment UE, resource pool configuration information, where the resource pool configuration information includes frequency domain resource location information and time domain resource location information, the frequency domain resource location information includes a frequency domain resource pool indicator and a frequency domain spacing between two consecutive device to device D2D resources, and the resource pool configuration information is used for determining an available frequency domain resource for D2D communication; determining, by the UE, the available frequency domain resource based on the resource pool configuration information; and performing, by the UE, D2D communication on the available frequency domain resource. In this case, a frequency domain range of a PRB in which D2D data is located can be greatly reduced by adjusting a parameter of the frequency domain spacing between the two consecutive D2D resources. Therefore, when performing blind detection, the UE may perform detection only on a location of the available frequency domain resource that has been determined, so that a detection range and detection times are greatly reduced, thereby reducing detection complexity and device power consumption.

In a possible design of the first aspect, the frequency domain resource pool indicator is a frequency domain resource offset indicator.

In a possible design of the first aspect, the determining, by the UE, the available frequency domain resource based on the resource pool configuration information includes: determining, by the UE, a frequency domain range of the available frequency domain resource based on a total quantity of physical transport blocks within a system bandwidth and the frequency domain resource offset indicator; and determining, by the UE, a location of the available frequency domain resource based on the frequency domain range of the available frequency domain resource and the frequency domain spacing between the two consecutive D2D resources.

With reference to the foregoing possible designs, in a possible design of the first aspect, the frequency domain resource offset indicator uses a physical resource block or a sub-band as a unit.

In a possible design of the first aspect, a reference location of the frequency domain resource offset indicator is a start location of the system bandwidth or an end location of the system bandwidth.

With reference to the foregoing possible designs, in a possible design of the first aspect, the available frequency domain resource is determined based on the resource pool configuration information by using the following formulas:

the following formula 1 is applied if the reference location of the frequency domain resource offset indicator is the start location of the system bandwidth:

$$\text{Mod}(m-\text{FreqOffsetIndicator}, \text{InterDis})=0; \text{ or} \quad \text{formula 1:}$$

the following formula 2 is applied if the reference location of the frequency domain resource offset indicator is the end location of the system bandwidth:

$$\text{Mod}(N-1-\text{FreqOffsetIndicator}-m, \text{InterDis})=0, \text{ where} \quad \text{formula 2:}$$

m is an index of a physical resource block PRB in which the available frequency domain resource is located, m is an integer less than N, N is the total quantity of the PRBs within the system bandwidth, FreqOffsetIndicator is the frequency domain resource offset indicator, and InterDis is the frequency domain spacing between the two consecutive D2D resources.

In a possible design of the first aspect, the frequency domain resource pool indicator is a start location and an end location of the available frequency domain resource.

With reference to the foregoing possible designs, in a possible design of the first aspect, the determining, by the UE, the available frequency domain resource based on the resource pool configuration information includes:

determining, by the UE, a frequency domain range of the available frequency domain resource based on the start location and the end location of the available frequency domain resource; and determining, by the UE, a location of the available frequency domain resource based on the frequency domain range of the available frequency domain resource and the frequency domain spacing between the two consecutive D2D resources.

With reference to the foregoing possible designs, in a possible design of the first aspect, the frequency domain spacing between the two consecutive D2D resources uses a physical resource block or a sub-band as a unit.

With reference to the foregoing possible designs, in a possible design of the first aspect, the frequency domain spacing between the two consecutive D2D resources is preconfigured, configured by a base station, or determined based on the system bandwidth.

With reference to the foregoing possible designs, in a possible design of the first aspect, the frequency domain spacing between the two consecutive D2D resources is:

a frequency domain spacing between two consecutive physical resource blocks used for transmitting scheduling assignment SA information; or a frequency domain spacing between first physical resource blocks in two consecutive physical resource block sets used for transmitting service data.

With reference to the foregoing possible designs, in a possible design of the first aspect, the performing, by the UE, D2D communication on the available frequency domain resource includes:

performing, by the UE, detection on the available frequency domain resource, and receiving, when D2D data is detected, the D2D data; or selecting, by the UE, any available frequency domain resource from the available frequency domain resource, and sending D2D data on a location of the selected time-frequency resource.

According to a second aspect, user equipment is provided, including:

a transceiver unit, configured to receive resource pool configuration information, where the resource pool configuration information includes frequency domain resource location information and time domain resource location information, the frequency domain resource location information includes a frequency domain resource pool indicator and a frequency domain spacing between two consecutive D2D resources, and the frequency domain resource pool indicator is used for indicating a frequency domain range of an available frequency domain resource; and a determining unit, configured to determine the available frequency domain resource based on the resource pool configuration information, where the transceiver unit is further configured to perform D2D communication on the available frequency domain resource. In this case, a frequency domain range of a PRB in which D2D data is located can be greatly reduced by adjusting a parameter of the frequency domain spacing between the two consecutive D2D resources. Therefore, when performing blind detection, the UE may perform detection only on a location of the available frequency domain resource that has been determined, so that a detection range and detection times are greatly reduced, thereby reducing detection complexity and device power consumption.

With reference to the foregoing possible design, in a possible design of the second aspect, the frequency domain resource pool indicator is a frequency domain resource offset indicator.

With reference to the foregoing possible designs, in a possible design of the second aspect, the determining unit is configured to: determine the frequency domain range of the available frequency domain resource based on a total quantity of physical transport blocks within a system bandwidth and the frequency domain resource offset indicator; and determine a location of the available frequency domain resource based on the frequency domain range of the available frequency domain resource and the frequency domain spacing between the two consecutive D2D resources.

With reference to the foregoing possible designs, in a possible design of the second aspect, the frequency domain resource offset indicator uses any representation form of a frequency domain resource granularity as a unit.

With reference to the foregoing possible designs, in a possible design of the second aspect, the frequency domain resource offset indicator uses a physical resource block or a sub-band as the unit.

With reference to the foregoing possible designs, in a possible design of the second aspect, a reference location of the frequency domain resource offset indicator is a start location of the system bandwidth or an end location of the system bandwidth.

With reference to the foregoing possible designs, in a possible design of the second aspect, the determining unit is configured to:

apply the following formula 1 if the reference location of the frequency domain resource offset indicator is the start location of the system bandwidth:

$$\text{Mod}(m-\text{FreqOffsetIndicator}, \text{InterDis})=0; \text{ or} \qquad \text{formula 1:}$$

apply the following formula 2 if the reference location of the frequency domain resource offset indicator is the end location of the system bandwidth:

$$\text{Mod}(N-1-\text{FreqOffsetIndicator}-m, \text{InterDis})=0, \text{ where} \qquad \text{formula 2:}$$

m is an index of a physical resource block PRB in which the available frequency domain resource is located, m is an integer less than N, N is the total quantity of the PRBs within the system bandwidth, FreqOffsetIndicator is the frequency domain resource offset indicator, and InterDis is the frequency domain spacing between the two consecutive D2D resources.

In a possible design of the second aspect, the frequency domain resource pool indicator is a start location and an end location of the available frequency domain resource.

With reference to the foregoing possible designs, in a possible design of the second aspect, the determining unit is configured to: determine the frequency domain range of the available frequency domain resource based on the start location and the end location of the available frequency domain resource; and determine a location of the available frequency domain resource based on the frequency domain range of the available frequency domain resource and the frequency domain spacing between the two consecutive D2D resources.

With reference to the foregoing possible designs, in a possible design of the second aspect, the frequency domain spacing between the two consecutive D2D resources uses any representation form of a frequency domain resource granularity as a unit.

With reference to the foregoing possible designs, in a possible design of the second aspect, the frequency domain spacing between the two consecutive D2D resources uses a physical resource block or a sub-band as the unit.

With reference to the foregoing possible designs, in a possible design of the second aspect, the frequency domain spacing between the two consecutive D2D resources is preconfigured, configured by a base station, or determined based on the system bandwidth.

With reference to the foregoing possible designs, in a possible design of the second aspect, the frequency domain spacing between the two consecutive D2D resources is:

a frequency domain spacing between two consecutive physical resource blocks used for transmitting scheduling assignment SA information; or a frequency domain spacing between first physical resource blocks in two consecutive physical resource block sets used for transmitting service data.

With reference to the foregoing possible designs, in a possible design of the second aspect, the transceiver unit is configured to: perform detection on the available frequency domain resource, and receive, when D2D data is detected, the D2D data; or select any available frequency domain resource from the available frequency domain resource, and send D2D data on a location of the selected time-frequency resource.

According to a third aspect, a D2D communication method is provided, including: sending resource pool configuration information, where the resource pool configuration information includes frequency domain resource location information and time domain resource location information, the frequency domain resource location information includes a frequency domain resource pool indicator and a frequency domain spacing between two consecutive D2D resources, and the resource pool configuration information is used for determining an available frequency domain resource for D2D communication.

In a possible design of the third aspect, the sending resource pool configuration information includes:

broadcasting a system message, where the system message carries the resource pool configuration information; or sending RRC signaling, where the RRC signaling carries the resource pool configuration information; or sending common control signaling, where the common control signaling carries the resource pool configuration information.

With reference to the foregoing possible design, in a possible design of the third aspect, the frequency domain resource pool indicator is a frequency domain resource offset indicator.

With reference to the foregoing possible designs, in a possible design of the third aspect, the frequency domain resource offset indicator uses any representation form of a frequency domain resource granularity as a unit.

With reference to the foregoing possible designs, in a possible design of the third aspect, the frequency domain resource offset indicator uses a physical resource block or a sub-band as the unit.

With reference to the foregoing possible designs, in a possible design of the third aspect, a reference location of the frequency domain resource offset indicator is a start location of a system bandwidth or an end location of a system bandwidth.

In a possible design of the third aspect, the frequency domain resource pool indicator is a start location and an end location of the available frequency domain resource.

With reference to the foregoing possible designs, in a possible design of the third aspect, the frequency domain spacing between the two consecutive D2D resources uses any representation form of a frequency domain resource granularity as a unit.

With reference to the foregoing possible designs, in a possible design of the third aspect, the frequency domain spacing between the two consecutive D2D resources uses a physical resource block or a sub-band as the unit.

With reference to the foregoing possible designs, in a possible design of the third aspect, the frequency domain spacing between the two consecutive D2D resources is preconfigured, configured by a base station, or determined based on the system bandwidth.

With reference to the foregoing possible designs, in a possible design of the third aspect, the frequency domain spacing between the two consecutive D2D resources is:

a frequency domain spacing between two consecutive physical resource blocks used for transmitting scheduling assignment SA information; or a frequency domain spacing between first physical resource blocks in two consecutive physical resource block sets used for transmitting service data.

According to a fourth aspect, a base station is provided, including: a sending unit, configured to send resource pool configuration information, where the resource pool configuration information includes frequency domain resource location information and time domain resource location information, the frequency domain resource location information includes a frequency domain resource pool indicator and a frequency domain spacing between two consecutive D2D resources, and the resource pool configuration information is used for determining an available frequency domain resource for D2D communication.

In a possible design of the fourth aspect, the sending unit is configured to:

broadcast a system message, where the system message carries the resource pool configuration information; or send RRC signaling, where the RRC signaling carries the resource pool configuration information; or send common control signaling, where the common control signaling carries the resource pool configuration information.

With reference to the foregoing possible design, in a possible design of the fourth aspect, the frequency domain resource pool indicator is a frequency domain resource offset indicator.

With reference to the foregoing possible designs, in a possible design of the fourth aspect, the frequency domain resource offset indicator uses any representation form of a frequency domain resource granularity as a unit.

With reference to the foregoing possible designs, in a possible design of the fourth aspect, the frequency domain resource offset indicator uses a physical resource block or a sub-band as the unit.

With reference to the foregoing possible designs, in a possible design of the fourth aspect, a reference location of the frequency domain resource offset indicator is a start location of a system bandwidth or an end location of a system bandwidth.

In a possible design of the fourth aspect, the frequency domain resource pool indicator is a start location and an end location of the available frequency domain resource.

With reference to the foregoing possible designs, in a possible design of the fourth aspect, the frequency domain spacing between the two consecutive D2D resources uses any representation form of a frequency domain resource granularity as a unit.

With reference to the foregoing possible designs, in a possible design of the fourth aspect, the frequency domain spacing between the two consecutive D2D resources uses a physical resource block or a sub-band as the unit.

With reference to the foregoing possible designs, in a possible design of the fourth aspect, the frequency domain spacing between the two consecutive D2D resources is preconfigured, configured by the base station, or determined based on the system bandwidth.

With reference to the foregoing possible designs, in a possible design of the fourth aspect, the frequency domain spacing between the two consecutive D2D resources is:

a frequency domain spacing between two consecutive physical resource blocks used for transmitting scheduling assignment SA information; or a frequency domain spacing between first physical resource blocks in two consecutive physical resource block sets used for transmitting service data.

According to a fifth aspect, an embodiment of the present invention provides user equipment, including: a transmitter, a receiver, and a processor separately connected to the transmitter and the receiver. Certainly, the user equipment may further include general-purpose components such as an antenna, a baseband processing component, an intermediate radio frequency processing component, and an input/output apparatus. This is not limited herein in this embodiment of the present invention. The user equipment is configured to perform the D2D communication method on any user equipment side in the first aspect by using the transmitter, the receiver, and the processor, to reduce detection complexity and power consumption.

According to a sixth aspect, an embodiment of the present invention provides a base station, including: a transmitter, a receiver, a memory, and a processor separately connected to the transmitter, the receiver, and the memory. Certainly, the base station may further include general-purpose components such as an antenna, a baseband processing component, an intermediate radio frequency processing component, and an input/output apparatus. This is not limited herein in this embodiment of the present invention. The base station is configured to perform the D2D communication method on any base station side in the third aspect by using the transmitter, the receiver, and the processor, to reduce detection complexity and power consumption on a user equipment side, and to implement flexible configuration of a D2D resource.

For any one of the foregoing aspects, the D2D resource is a scheduling assignment SA resource or a service data resource.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes implementations of the present invention in detail with reference to the accompanying drawings.

Figure 1:
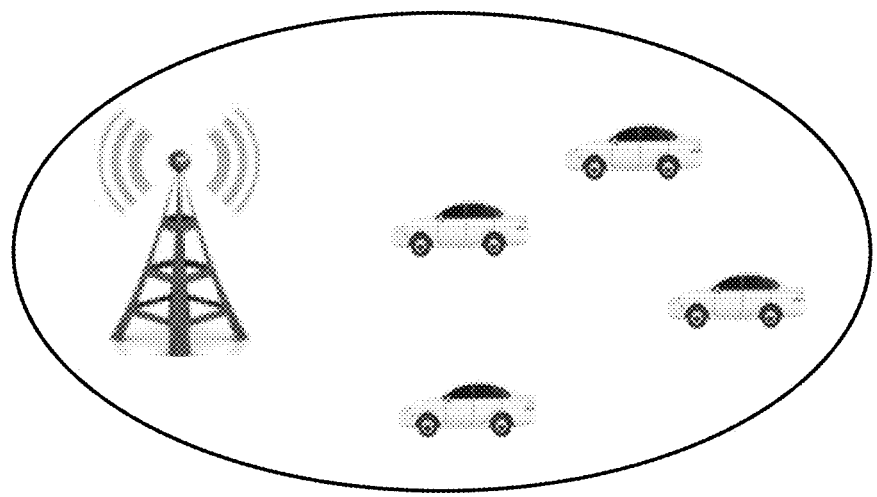
FIG. 1 is a schematic diagram of an implementation scenario according to an embodiment of the present invention.

FIG. 1 is a schematic diagram of an implementation scenario according to an embodiment of the present invention. Referring to FIG. 1, the implementation scenario includes user equipment (UE) and a base station. The UE provided in this embodiment of the present invention may be an in-vehicle communications system, or user equipment mounted on a vehicle, or some user equipments such as a smartphone or a handheld device that are held by a user in the vehicle, or a handheld terminal device and a wearable device of a pedestrian or a rider, for example, a smartwatch or a smart helmet. The base station may be a device that has a radio resource management function, and can communicate with the user equipment, or is used as a central controller to assist direct communication between user equipments.

To enable the user equipment to learn a location of an available frequency domain resource, the base station may add frequency domain resource location information and time domain resource location information to resource pool configuration information. The time domain resource location information may be represented in an existing resource pool configuration manner by using two parameters: timeOffsetIndicator: a time domain resource offset indicator; and subframeBitmap: subframe bitmap information.

In this embodiment of the present invention, the frequency domain resource location information includes a frequency domain spacing between two consecutive D2D resources and a frequency domain resource offset indicator. The following separately describes the two parameters:

(1) The frequency domain spacing between the two consecutive D2D resources.

The frequency domain spacing between the two consecutive D2D resources may use any representation form of a frequency domain resource granularity as a unit. For example, for an SA resource pool, a frequency domain spacing between two consecutive SA resources uses a PRB or a sub-band as a unit. The sub-band refers to a set of some consecutive PRBs. Certainly, for a service data resource pool, a frequency domain spacing between two consecutive service data resources may also use a PRB or a sub-band as a unit.

It should be noted that the frequency domain spacing between the two consecutive D2D resources may be preconfigured, configured by the base station, or determined based on a system bandwidth. The preconfiguration and the configuration by the base station are explicit configuration and are directly represented in a form of a numerical value or the like. The determining based on the system bandwidth may be considered as implicit configuration, and to be specific, a correspondence between a system bandwidth and a frequency domain spacing is preset. For example, a frequency domain spacing corresponding to a system bandwidth of 10 MHz is 1, and a frequency domain spacing corresponding to a system bandwidth of 20 MHz is 2. Therefore, if a current system bandwidth is 10 MHz, it is determined that the frequency domain spacing between the two consecutive D2D resources is 1.

The frequency domain spacing between the two consecutive D2D resources may have different explanations for different types of D2D data. For example, for SA information, the frequency domain spacing between the two D2D resources may be a frequency domain spacing between two consecutive physical resource blocks used for transmitting the scheduling assignment SA information. For service data, the frequency domain spacing between the two D2D resources may be a frequency domain spacing between first physical resource blocks in two consecutive physical resource block sets used for transmitting the service data. The service data may be transmitted by using a physical resource block set including a plurality of consecutive physical resource blocks. Therefore, the frequency domain spacing herein may be a frequency domain spacing between a first physical resource block in a physical resource block set used for transmitting service data 1 and a first physical resource block in a physical resource block set used for transmitting service data 2.

(2) A frequency domain resource pool indicator. The frequency domain resource pool indicator is represented in at least two following manners:

In a first representation manner, the frequency domain resource pool indicator is represented by using a frequency domain resource offset indicator.

The frequency domain resource offset indicator may use any representation form of a frequency domain resource granularity as a unit. For example, the frequency domain resource offset indicator uses a physical resource block (PRB) or a sub-band as the unit.

Further, a reference location of the frequency domain resource offset indicator is a start location of the system bandwidth, for example, a first PRB; or a reference location of the frequency domain resource offset indicator is an end location of the system bandwidth, for example, a last PRB.

Assuming that the start location of the system bandwidth is used as the reference location and the PRB is used as the unit of the frequency domain resource offset indicator, if the frequency domain resource offset indicator is 4, it may be determined that a start location of a frequency domain resource pool is a fourth PRB after the start location of the system bandwidth.

Figure 2:
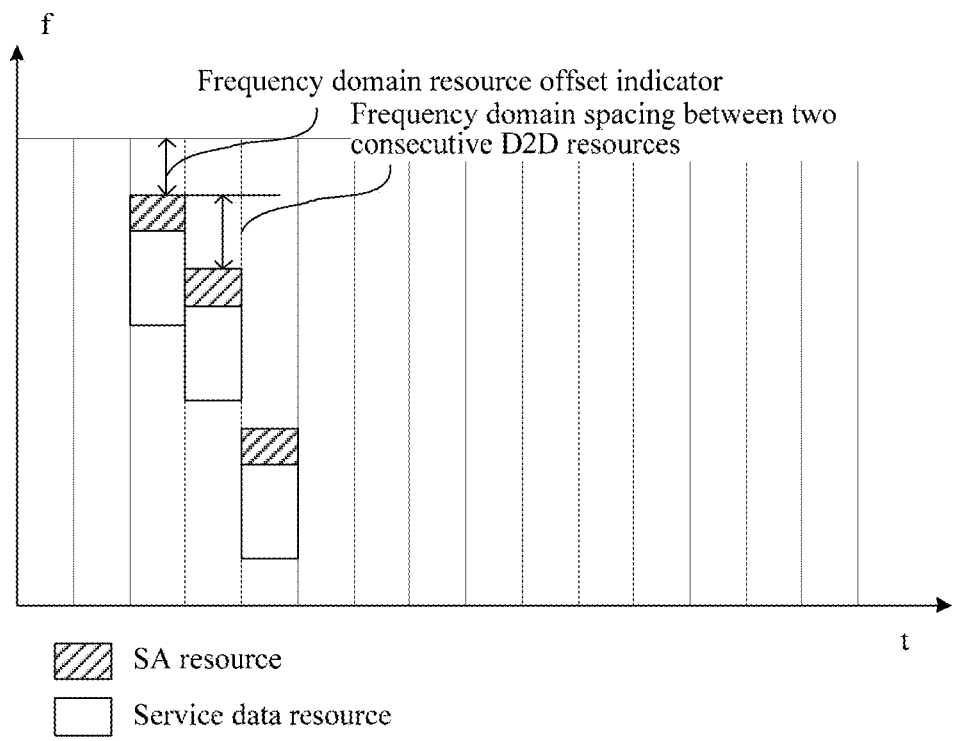
FIG. 2 is a schematic diagram of a time-frequency resource according to an embodiment of the present invention.

Referring to FIG. 2, FIG. 2 is a schematic diagram of a time-frequency resource according to an embodiment of the present invention. A lateral axis t is used for representing a time domain resource, and a longitudinal axis f is used for representing a frequency domain resource. The frequency domain resource offset indicator FreqOffsetIndicator is used for indicating a frequency domain offset of a D2D resource based on a reference location, and the frequency domain resource offset indicator may be considered as a start location or an end location of the D2D resource in a frequency domain.

In a second representation manner, the frequency domain resource pool indicator is represented by using a start location and an end location of an available frequency domain resource.

In the second representation manner, the start location and the end location of the frequency domain resource may be represented in a manner of a PRB index or the like.

Figure 3:
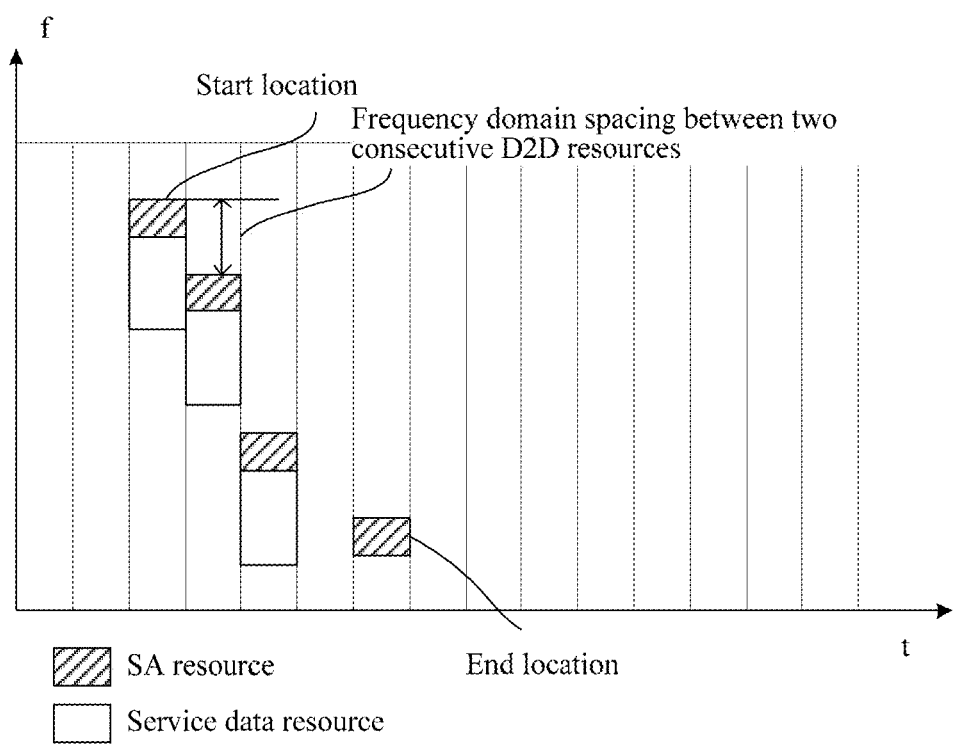
FIG. 3 is a schematic diagram of a time-frequency resource according to an embodiment of the present invention.

Referring to FIG. 3, FIG. 3 is a schematic diagram of a time-frequency resource according to an embodiment of the present invention. A lateral axis t is used for representing a time domain resource, and a longitudinal axis f is used for representing a frequency domain resource. A start location (PRB_start) and an end location (PRB_end) of the frequency domain resource are used for indicating a frequency domain range of a D2D resource.

Figure 4:
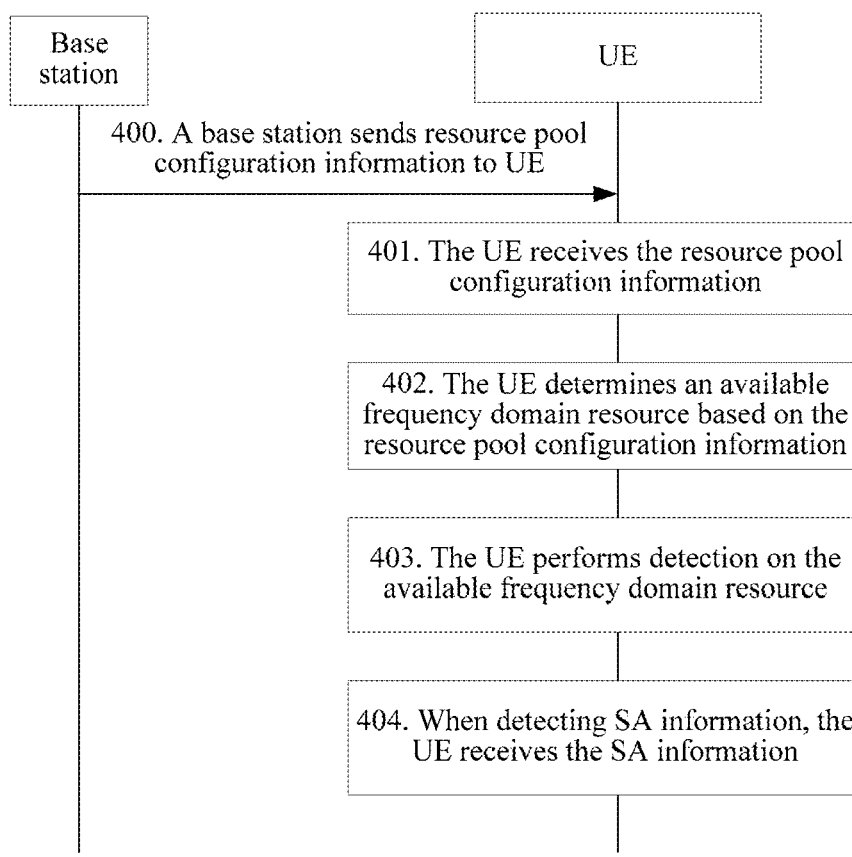
FIG. 4 is a flowchart of a D2D communication method according to an embodiment of the present invention.

In the following, only an example in which the SA resource pool is represented in the first representation manner is used for description. FIG. 4 is a flowchart of a D2D communication method according to an embodiment of the present invention. Referring to FIG. 4, the method includes the following steps.

400. A base station sends resource pool configuration information to UE, where the resource pool configuration information includes frequency domain resource location information and time domain resource location information, and the frequency domain resource location information includes a frequency domain resource offset indicator and a frequency domain spacing between two consecutive SA resources.

The resource pool configuration information may be carried in a system broadcast message or another signaling such as radio resource control (RRC) signaling or common control signaling of the base station. This is not specifically limited in this embodiment of the present invention.

401. The UE receives the resource pool configuration information.

It should be noted that signaling that specifically carries the resource pool configuration information may be preconfigured by a system, so that the UE extracts the resource pool configuration information from the signaling when receiving the signaling.

Whether the frequency domain resource offset indicator is relative to a start location or an end location of a system bandwidth may be preconfigured by the system, so that the UE may determine a frequency domain range of an available frequency domain resource with reference to the system bandwidth when receiving the frequency domain resource indicator.

402. The UE determines an available frequency domain resource based on the resource pool configuration information.

Because the frequency domain resource offset indicator and the frequency domain spacing between the two consecutive SA resources are already learned, frequency domain resources that may be used for transmitting D2D data may be learned.

Step 402 may specifically include the following step 402A and step 402B.

402A. The UE determines a frequency domain range of the available frequency domain resource based on a total quantity of physical transport blocks within a system bandwidth and the frequency domain resource offset indicator.

For example, when the total quantity of physical transport blocks within the system bandwidth is 100 and the frequency domain resource offset indicator is 4, it may be determined that the frequency domain range of frequency domain resources is PRBs whose PRB indexes are 4 to 99.

402B. The UE determines a location of the available frequency domain resource based on the frequency domain range of the available frequency domain resource and the frequency domain spacing between the two consecutive SA resources.

Based on the foregoing example, if the frequency domain spacing between the two consecutive SA resources is 4 and a unit is a PRB, the location of the available frequency domain resource may be determined. To be specific, PRBs that can be used for SA transmission are 4, 8, 12, 16, ..., and so on.

In addition, in step 402, the following process may be alternatively used to determine the available frequency domain resource:

applying the following formula 1 if the reference location of the frequency domain resource offset indicator is the start location of the system bandwidth:

Mod($m$-FreqOffsetIndicator,InterDis)=0; or    formula 1:

applying the following formula 2 if the reference location of the frequency domain resource offset indicator is the end location of the system bandwidth:

Mod($N$-1-FreqOffsetIndicator-$m$,InterDis)=0, where    formula 2:

m is an index of a physical resource block PRB in which the available frequency domain resource is located, m is an integer less than N, N is the total quantity of the PRBs within the system bandwidth, FreqOffsetIndicator is the frequency domain resource offset indicator, and InterDis is the frequency domain spacing between the two consecutive device to device D2D resources.

The formula 1 is used as an example.

For example, if FreqOffsetIndicator=0 and InterDis=4, PRBs in the system that can be used for SA transmission are 0, 4, 8, 12 . . . .

For example, if FreqOffsetIndicator=8 and InterDis=2, PRBs in the system that can be used for SA transmission are 8, 10, 12, 14 . . . .

For example, if FreqOffsetIndicator=1 and InterDis=2, PRBs in the system that can be used for SA transmission are 1, 3, 5, 7 . . . .

403. The UE performs detection on the available frequency domain resource.

In this case, because a frequency domain range of a PRB in which SA information is located is greatly reduced, when performing blind detection, the UE may perform detection only on the determined location of the available frequency domain resource, so that a detection range and detection times are greatly reduced, thereby reducing detection complexity and device power consumption.

404. The UE receives service data information when detecting SA information.

After receiving the SA information, the UE may receive service data from a transmit end by using a location of a time-frequency resource indicated by the SA information.

In a scenario in which an SA resource and a service data resource are consecutive in a frequency domain, the UE may alternatively directly determine, based on a time-frequency resource on which the SA information is located, a time-frequency resource on which the service data is located. Therefore, in such a resource representation manner, only an SA resource pool or a data resource pool needs to be configured, and there is no need to configure two resource pools.

In the method provided in this embodiment of the present invention, two frequency domain resource indicator parameters are added to SA resource pool configuration information, so that a frequency domain resource of an SA resource pool can be effectively indicated, thereby greatly reducing a detection range and detection times, and reducing detection complexity and device power consumption. In addition, because the configuration information is represented by using the frequency domain spacing between the two consecutive SA resources, the base station is allowed to flexibly configure a size of the SA resource, thereby greatly improving resource utilization.

The embodiment shown in FIG. 4 uses only the SA resource pool as an example for description. Actually, for a service data resource pool of the D2D data, configuration may be performed in a similar manner. Two frequency domain resource indicator parameters are added to service data resource pool configuration information, so that a frequency domain resource in the service data resource pool can be effectively indicated, thereby greatly reducing a detection range and detection times, and reducing detection complexity and device power consumption.

The foregoing embodiments all describe a scenario in which the user equipment is used as a receive end. Actually, the user equipment may alternatively be used as a transmit end for sending D2D data. Specifically, refer to a D2D communication process shown in FIG. 5.

500. A base station sends resource pool configuration information to UE, where the resource pool configuration information includes frequency domain resource location information and time domain resource location information, and the frequency domain resource location information includes a start location and an end location of a frequency domain resource and a frequency domain spacing between two consecutive SA resources.

This embodiment of the present invention uses only SA resource pool configuration information of the resource pool configuration information as an example for description. Actually, the resource pool configuration information sent by the base station may include the SA resource pool configuration information and service data resource pool configuration information. Certainly, if an SA resource and a service data resource are consecutive in a frequency domain, alternatively, only the SA resource pool configuration information or the service data resource pool configuration information may be carried, and a frequency domain location of one may be calculated based on that of the other, to improve utilization of the configuration information.

501. The UE receives the resource pool configuration information.

502. The UE determines an available frequency domain resource based on the resource pool configuration information.

The UE may determine, based on the start location and the end location of the frequency domain resource, a frequency domain range of the available frequency domain resource, and then determine a location of the available frequency domain resource based on the frequency domain range of the available frequency domain resource and the frequency domain spacing between the two consecutive SA resources.

For example, when the start location of the frequency domain resource is 10 and the end location of the frequency domain resource is 60, it may be determined that PRBs within the frequency domain range of the frequency domain resource are 10 to 60. If the frequency domain spacing between the two consecutive SA resources is 4 and a unit is the PRB, the location of the available frequency domain resource may be determined. To be specific, PRBs that can be used for SA transmission are 10, 14, 18, 22, . . . , and so on.

503. The UE selects any available frequency domain resource from the available frequency domain resource, and sends SA information on a location of the selected time-frequency resource.

When selecting a transmission resource of a resource pool, the UE may select the transmission resource from the available frequency domain resource based on the resource pool configuration information, to improve selection efficiency. In addition, a detection range and detection times of the receive end are greatly reduced in a receiving process by using a frequency domain resource of a service data resource pool that is indicated in the configuration information, thereby reducing detection complexity and device power consumption.

Figure 6:
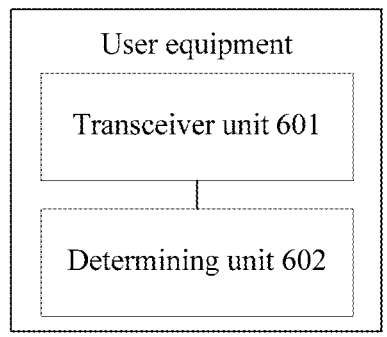
FIG. 6 is a schematic structural diagram of user equipment according to an embodiment of the present invention.

FIG. 6 is a schematic structural diagram of user equipment according to an embodiment of the present invention. Referring to FIG. 6, the user equipment includes:

a transceiver unit 601, configured to receive resource pool configuration information, where the resource pool configuration information includes frequency domain resource location information and time domain resource location information, the frequency domain resource location information includes a frequency domain resource pool indicator and a frequency domain spacing between two consecutive device to device D2D resources, and the frequency domain resource pool indicator is used for indicating a frequency domain range of an available frequency domain resource; and a determining unit 602, configured to determine the available frequency domain resource based on the resource pool configuration information, where the transceiver unit 601 is further configured to perform D2D communication on the available frequency domain resource.

Optionally, the frequency domain resource pool indicator is a frequency domain resource offset indicator.

Optionally, the determining unit 602 is configured to: determine the frequency domain range of the available frequency domain resource based on a total quantity of physical transport blocks within a system bandwidth and the frequency domain resource offset indicator; and determine a location of the available frequency domain resource based on the frequency domain range of the available frequency domain resource and the frequency domain spacing between the two consecutive D2D resources.

Optionally, the frequency domain resource offset indicator uses any representation form of a frequency domain resource granularity as a unit.

Optionally, the frequency domain resource offset indicator uses a physical resource block or a sub-band as the unit.

Optionally, a reference location of the frequency domain resource offset indicator is a start location of the system bandwidth or an end location of the system bandwidth.

Optionally, the determining unit 602 is configured to:
apply the following formula 1 if the reference location of the frequency domain resource offset indicator is the start location of the system bandwidth:

Mod(*m*−FreqOffsetIndicator,InterDis)=0; or  formula 1:

apply the following formula 2 if the reference location of the frequency domain resource offset indicator is the end location of the system bandwidth:

Mod(*N*−1−FreqOffsetIndicator−*m*,InterDis)=0, where  formula 2:

m is an index of a physical resource block PRB in which the available frequency domain resource is located, m is an integer less than N, N is the total quantity of the PRBs within the system bandwidth, FreqOffsetIndicator is the frequency domain resource offset indicator, and InterDis is the frequency domain spacing between the two consecutive device to device D2D resources.

Optionally, the frequency domain resource pool indicator is a start location and an end location of the available frequency domain resource.

Optionally, the determining unit 602 is configured to: determine the frequency domain range of the available frequency domain resource based on the start location and the end location of the available frequency domain resource; and determine a location of the available frequency domain resource based on the frequency domain range of the available frequency domain resource and the frequency domain spacing between the two consecutive D2D resources.

Optionally, the frequency domain spacing between the two consecutive D2D resources uses any representation form of a frequency domain resource granularity as a unit.

Optionally, the frequency domain spacing between the two consecutive D2D resources uses a physical resource block or a sub-band as the unit.

Optionally, the frequency domain spacing between the two D2D resources is preconfigured, configured by a base station, or determined based on the system bandwidth.

Optionally, the frequency domain spacing between the two consecutive D2D resources is:

a frequency domain spacing between two consecutive physical resource blocks used for transmitting scheduling assignment SA information; or a frequency domain spacing between first physical resource blocks in two consecutive physical resource block sets used for transmitting service data.

Optionally, the transceiver unit 601 is configured to: perform detection on the available frequency domain resource, and receive, when D2D data is detected, the D2D data; or select any available frequency domain resource from the available frequency domain resource, and send D2D data on a location of the selected time-frequency resource.

The transceiver unit may be a receiver, a transmitter, or a transceiver. The determining unit may be, in a hardware form, embedded in or independent of a processor of the user equipment, or may be stored, in a software form, in a memory of the user equipment, so that the processor invokes the determining unit to perform the operations corresponding to the foregoing modules. The processor may be a central processing unit (CPU), a microprocessor, a single-chip microcomputer, or the like.

Figure 7:
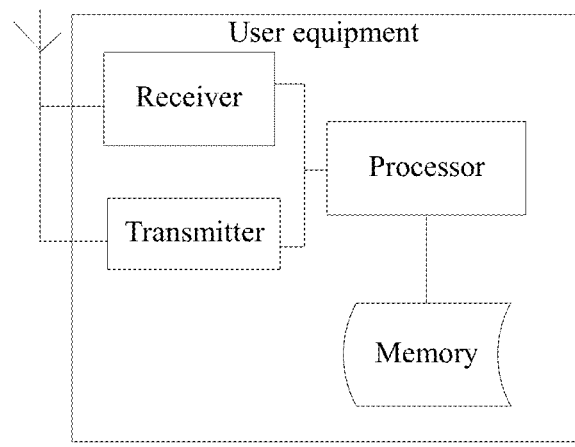
FIG. 7 is a schematic structural diagram of user equipment according to an embodiment of the present invention.

Referring to FIG. 7, FIG. 7 is a schematic structural diagram of user equipment according to an embodiment of the present invention. As shown in this figure, the user equipment includes a transmitter, a receiver, a memory, and a processor separately connected to the transmitter, the receiver, and the memory. Certainly, the user equipment may further include general-purpose components such as an antenna, a baseband processing component, an intermediate radio frequency processing component, and an input/output apparatus. This is not limited herein in this embodiment of the present invention.

Figure 5:
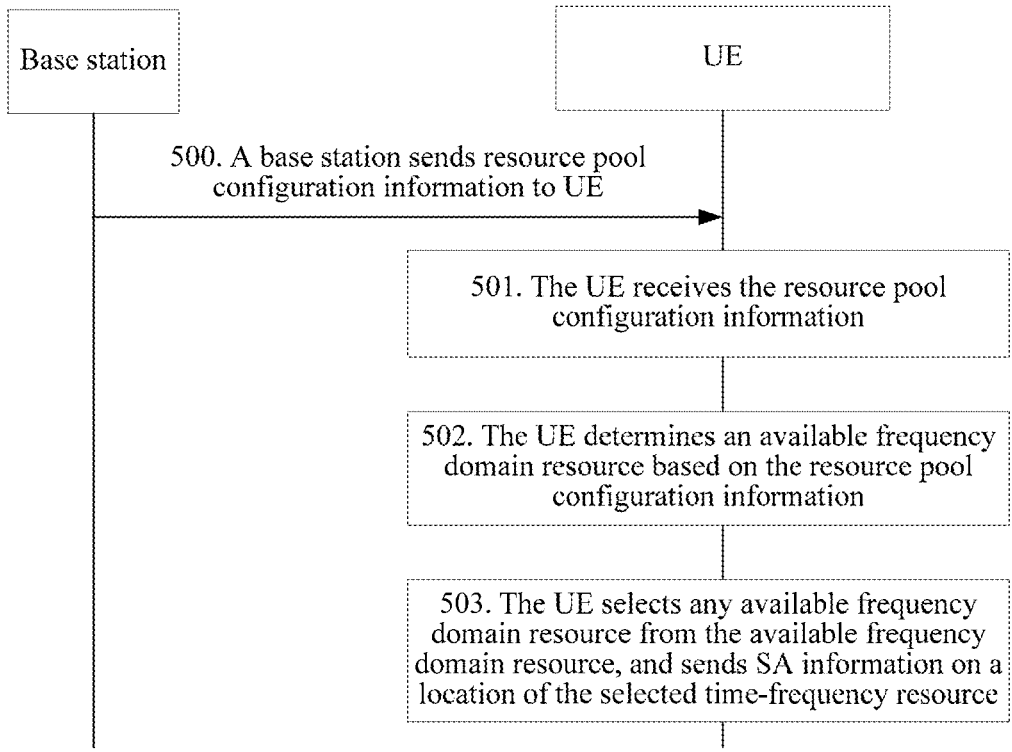
FIG. 5 is a flowchart of a D2D communication method according to an embodiment of the present invention.

The user equipment is configured to perform the D2D communication method on a user equipment side in the embodiment in FIG. 5 or FIG. 6.

FIG. 7 is a schematic structural diagram of a base station according to an embodiment of the present invention. Referring to FIG. 7, the base station includes:

a sending unit 701, configured to send resource pool configuration information, where the resource pool configuration information includes frequency domain resource location information and time domain resource location information, the frequency domain resource location information includes a frequency domain resource pool indicator and a frequency domain spacing between two consecutive device to device D2D resources, and the resource pool configuration information is used for determining an available frequency domain resource for D2D communication.

Optionally, the sending unit 701 is configured to:

broadcast a system message, where the system message carries the resource pool configuration information; or send RRC signaling, where the RRC signaling carries the resource pool configuration information; or send common control signaling, where the common control signaling carries the resource pool configuration information.

Optionally, the frequency domain resource pool indicator is a frequency domain resource offset indicator.

Optionally, the frequency domain resource offset indicator uses any representation form of a frequency domain resource granularity as a unit.

Optionally, the frequency domain resource offset indicator uses a physical resource block or a sub-band as the unit.

Optionally, a reference location of the frequency domain resource offset indicator is a start location of a system bandwidth or an end location of a system bandwidth.

Optionally, the frequency domain resource pool indicator is a start location and an end location of the available frequency domain resource.

Optionally, the frequency domain spacing between the two consecutive D2D resources uses any representation form of a frequency domain resource granularity as a unit.

Optionally, the frequency domain spacing between the two consecutive D2D resources uses a physical resource block or a sub-band as the unit.

Optionally, the frequency domain spacing between the two D2D resources may be preconfigured, configured by the base station, or determined based on the system bandwidth.

Optionally, the frequency domain spacing between the two consecutive D2D resources is:

a frequency domain spacing between two consecutive physical resource blocks used for transmitting scheduling assignment SA information; or a frequency domain spacing between first physical resource blocks in two consecutive physical resource block sets used for transmitting service data.

Optionally, the D2D resource is a scheduling assignment SA resource or a service data resource.

The sending unit may be a transmitter or a transceiver. Certainly, the base station may further include structures such as a receiving unit and a control unit, the receiving unit may be a receiver or a transceiver, and the sending unit and the receiving unit may be integrated together to form a transceiver unit and implemented as a transceiver in terms of hardware. The control unit may be, in a hardware form, embedded in or independent of a processor of the base station, or may be stored, in a software form, in a memory of the base station, so that the processor invokes the control unit to perform the operations corresponding to the foregoing modules. The processor may be a central processing unit (CPU), a microprocessor, a single-chip microcomputer, or the like.

Figure 9:
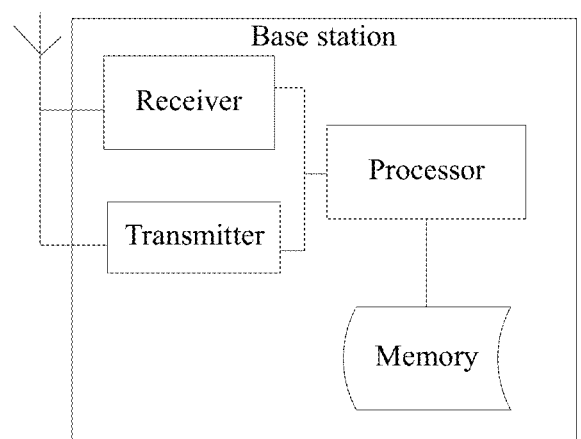
FIG. 9 is a schematic structural diagram of a base station according to an embodiment of the present invention.

Referring to FIG. 9, FIG. 9 is a schematic structural diagram of a base station according to an embodiment of the present invention. As shown in this figure, the base station includes a transmitter, a receiver, a memory, and a processor separately connected to the transmitter, the receiver, and the memory. Certainly, the base station may further include general-purpose components such as an antenna, a baseband processing component, an intermediate radio frequency processing component, and an input/output apparatus. This is not limited herein in this embodiment of the present invention.

Figure 8:
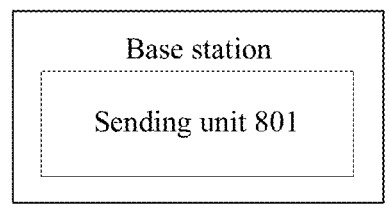
FIG. 8 is a schematic structural diagram of a base station according to an embodiment of the present invention.

The base station is configured to perform the D2D communication method on a base station side in any one of the embodiments in FIG. 6 to FIG. 8.

A person of ordinary skill in the art may understand that all or some of the steps of the embodiments may be implemented by hardware or by a program instructing related hardware. The program may be stored in a computer-readable storage medium. The storage medium may be a read-only memory, a magnetic disk, an optical disc, or the like.

The foregoing descriptions are merely example embodiments of the present invention, but are not intended to limit the present invention. Any modification, equivalent replacement, and improvement made without departing from the spirit and principle of the present invention shall fall within the protection scope of the present invention.

What is claimed is:

1. A device to device (D2D) communication method, comprising:

receiving, by a user equipment (UE), resource pool configuration information comprising information for determining a plurality of frequency domain resources in a single resource pool, wherein the plurality of frequency domain resources are available for receiving scheduling assignment (SA) information, wherein the plurality of frequency domain resources are periodic in a frequency domain, wherein the resource pool configuration information comprises frequency domain resource location information, wherein the frequency domain resource location information comprises information for determining locations of the plurality of frequency domain resources in the frequency domain, wherein the frequency domain resource location information comprises a frequency domain resource offset indicator and a frequency domain spacing between two consecutive frequency domain resources of the plurality of frequency domain resources in the single resource pool, wherein the frequency domain resource offset indicator comprises a start location of a first frequency domain resource of the plurality of frequency domain resources in the single resource pool in the frequency domain, and wherein the frequency domain spacing between two consecutive frequency domain resources of the plurality of frequency domain resources comprises a frequency domain spacing between two consecutive physical resource blocks that are available for receiving the SA information;

determining, by the UE and based on the frequency domain resource offset indicator and the frequency domain spacing between two consecutive physical resource blocks that are available for receiving the SA information, the plurality of frequency domain resources that are available for receiving the SA information; and detecting, by the UE and from the determined plurality of frequency domain resources that are available for receiving the SA information, a frequency domain resource in which the SA information is located.

2. The method according to claim 1, wherein the frequency domain resource offset indicator uses a physical resource block or a sub-band as a unit.

3. The method according to claim 1, wherein a reference location of the frequency domain resource offset indicator is a start location of a system bandwidth or an end location of the system bandwidth.

4. The method according to claim 1, wherein the frequency domain spacing between the two consecutive frequency domain resources of the plurality of frequency domain resources uses a physical resource block or a sub-band as a unit.

5. The method according to claim 1, wherein the frequency domain spacing between the two consecutive frequency domain resources of the plurality of frequency domain resources is preconfigured, configured by a base station, or determined based on a system bandwidth.

6. A user equipment (UE), comprising:
a transceiver configured to receive resource pool configuration information comprising information for determining a plurality of frequency domain resources in a single resource pool, wherein the plurality of frequency domain resources are available for receiving scheduling assignment (SA) information, wherein the plurality of frequency domain resources are periodic in a frequency domain, wherein the resource pool configuration information comprises frequency domain resource location information, wherein the frequency domain resource location information comprises information for determining locations of the plurality of frequency domain resources in the frequency domain, wherein the frequency domain resource location information comprises a frequency domain resource offset indicator and a frequency domain spacing between two consecutive frequency domain resources of the plurality of frequency domain resources in the single resource pool, wherein the frequency domain resource offset indicator comprises a start location of a first frequency domain resource of the plurality of frequency domain resources in the single resource pool in the frequency domain, and wherein the frequency domain spacing between two consecutive frequency domain resources of the plurality of frequency domain resources comprises a frequency domain spacing between two consecutive physical resource blocks that are available for receiving the SA information;
at least one processor; and
a non-transitory computer-readable storage medium coupled to the at least one processor and storing programming instructions for execution by the at least one processor, the programming instructions instruct the at least one processor to determine, based on the frequency domain resource offset indicator and the frequency domain spacing between two consecutive physical resource blocks that are available for receiving the SA information, the plurality of frequency domain resources that are available for receiving the SA information, and
wherein the transceiver is further configured to detect, from the determined plurality of frequency domain resources that are available for receiving the SA information, a frequency domain resource in which the SA information is located.

7. The user equipment according to claim 6, wherein the frequency domain resource offset indicator uses a physical resource block or a sub-band as a unit.

8. The user equipment according to claim 6, wherein a reference location of the frequency domain resource offset indicator is a start location of a system bandwidth or an end location of the system bandwidth.

9. The user equipment according to claim 6, wherein the frequency domain spacing between the two consecutive frequency domain resources of the plurality of frequency domain resources uses a physical resource block or a sub-band as a unit.

10. The user equipment according to claim 6, wherein the frequency domain spacing between the two consecutive frequency domain resources of the plurality of frequency domain resources is preconfigured, configured by a base station, or determined based on a system bandwidth.

11. A device to device (D2D) communication method, comprising:
determining resource pool configuration information comprising information for determining a plurality of frequency domain resources in a single resource pool, wherein the plurality of frequency domain resources are available for transmitting scheduling assignment (SA) information, wherein the plurality of frequency domain resources are periodic in a frequency domain, wherein the resource pool configuration information comprises frequency domain resource location information, wherein the frequency domain resource location information comprises information for determining locations of the plurality of frequency domain resources in the frequency domain, wherein the frequency domain resource location information comprises a frequency domain resource offset indicator and a frequency domain spacing between two consecutive frequency domain resources of the plurality of frequency domain resources in the single resource pool, wherein the frequency domain resource offset indicator comprises a start location of a first frequency domain resource of the plurality of frequency domain resources in the single resource pool in the frequency domain, and wherein the frequency domain spacing between two consecutive frequency domain resources of the plurality of frequency domain resources comprises a frequency domain spacing between two consecutive physical resource blocks that are available for transmitting the SA information; and
sending the resource pool configuration information.

12. The method according to claim 11, wherein the sending the resource pool configuration information comprises:
broadcasting a system message, wherein the system message carries the resource pool configuration information;
sending radio resource control (RRC) signaling, wherein the RRC signaling carries the resource pool configuration information; or
sending common control signaling, wherein the common control signaling carries the resource pool configuration information.

13. The method according to claim 11, wherein the frequency domain resource offset indicator uses a physical resource block or a sub-band as a unit.

14. The method according to claim 11, wherein a reference location of the frequency domain resource offset indicator is a start location of a system bandwidth or an end location of the system bandwidth.

15. The method according to claim 11, wherein the frequency domain spacing between the two consecutive frequency domain resources of the plurality of frequency domain resources uses a physical resource block or a sub-band as a unit.

16. The method according to claim 11, wherein the frequency domain spacing between the two consecutive frequency domain resources of the plurality of frequency domain resources is preconfigured, configured by a base station, or determined based on a system bandwidth.

17. A base station, comprising:
at least one processor; and a non-transitory computer-readable storage medium coupled to the at least one processor and storing programming instructions for execution by the at least one processor, the programming instructions instruct the at least one processor to determine resource pool configuration information comprising information for determining a plurality of frequency domain resources in a single resource pool, wherein the plurality of frequency domain resources are available for transmitting scheduling assignment (SA) information, wherein the plurality of frequency domain resources are periodic in a frequency domain, wherein the resource pool configuration information comprises frequency domain resource location information, wherein the frequency domain resource location information comprises information for determining locations of the plurality of frequency domain resources in the frequency domain, wherein the frequency domain resource location information comprises a frequency domain resource offset indicator and a frequency domain spacing between two consecutive frequency domain resources of the plurality of frequency domain resources in the single resource pool, wherein the frequency domain resource offset indicator comprises a start location of a first frequency domain resource of the plurality of frequency domain resources in the single resource pool in the frequency domain, and wherein the frequency domain spacing between two consecutive frequency domain resources of the plurality of frequency domain resources comprises a frequency domain spacing between two consecutive physical resource blocks that are available for transmitting the SA information; and
a transmitter configured to send the resource pool configuration information.

18. The base station according to claim 17, wherein the transmitter is configured to:
broadcast a system message, wherein the system message carries the resource pool configuration information;
send RRC signaling, wherein the RRC signaling carries the resource pool configuration information; or
send common control signaling, wherein the common control signaling carries the resource pool configuration information.

19. The base station according to claim 17, wherein the frequency domain resource offset indicator uses a physical resource block or a sub-band as a unit.

20. The base station according to claim 17, wherein a reference location of the frequency domain resource offset indicator is a start location of a system bandwidth or an end location of the system bandwidth.

21. The base station according to claim 17, wherein the frequency domain spacing between the two consecutive frequency domain resources of the plurality of frequency domain resources uses a physical resource block or a sub-band as a unit.

22. The base station according to claim 17, wherein the frequency domain spacing between the two consecutive frequency domain resources of the plurality of frequency domain resources is preconfigured, configured by the base station, or determined based on a system bandwidth.

* * * * *